United States Patent [19]
Bieri jun.

[11] Patent Number: 5,645,040
[45] Date of Patent: Jul. 8, 1997

[54] CABLE SAW MACHINE FOR CUTTING CONCRETE BODIES, ROCKS OR THE LIKE

[75] Inventor: Hans Bieri jun., Pfäffikon, Switzerland

[73] Assignee: Hydrostress AG, Pfäffikon, Switzerland

[21] Appl. No.: 564,199

[22] PCT Filed: Sep. 21, 1994

[86] PCT No.: PCT/CH94/00186

§ 371 Date: Dec. 12, 1995

§ 102(e) Date: Dec. 12, 1995

[87] PCT Pub. No.: WO95/28263

PCT Pub. Date: Oct. 26, 1995

[30] Foreign Application Priority Data

Apr. 13, 1994 [CH] Switzerland ............... 01 107/94

[51] Int. Cl.$^6$ ................................................. A21B 1/00
[52] U.S. Cl. ................... 125/21; 451/439; 451/296; 125/12; 125/16.01; 125/16.02
[58] Field of Search ................ 125/21, 12, 16.01, 125/16.02; 451/439, 296; 83/651.1

[56] References Cited

U.S. PATENT DOCUMENTS

| 4,494,523 | 1/1985 | Wells | 125/16.01 |
| 4,633,848 | 1/1987 | Bresciani | 125/21 |
| 4,787,363 | 11/1988 | Kubo | 125/21 |
| 4,893,607 | 1/1990 | Kubo | 125/21 |
| 5,060,628 | 10/1991 | Ishida | 125/21 |

FOREIGN PATENT DOCUMENTS

| 0 279 305 | 8/1988 | European Pat. Off. . | |
| 312 582 | 4/1903 | France . | |
| 612 372 | 10/1926 | France . | |
| 4239212 | 5/1994 | Germany | 125/21 |
| 5098813 | 4/1993 | Japan . | |
| 406155445 | 6/1994 | Japan | 125/21 |

*Primary Examiner*—Robert A. Rose
*Assistant Examiner*—George Nguyen
*Attorney, Agent, or Firm*—Frishauf, Holtz, Goodman, Langer & Chick, P.C.

[57] ABSTRACT

A pulley block is provided for rope storage to receive reserve cable or rope in a rope saw machine (3). The saw rope (1) is slung around the deflecting rollers of a stationary roller carrier and of a movable roller carrier (5,6) mounted on a frame (4). Two hydraulic motors drive the saw rope (1). A chain hoist (9) driven by a motor (10) moves the vertically ajustable roller carrier (6). By winding the saw rope (1) in different ways over additional rollers (22, 24, 26) various rope storage capacities are obtained. This design allows the free rope loop to be stored in a particularly space-saving manner.

7 Claims, 6 Drawing Sheets

CABLE SAW MACHINE FOR CUTTING CONCRETE BODIES, ROCKS OR THE LIKE

FIELD OF THE INVENTION

The invention relates to a rope sawing machine and a method of rope swing.

BACKGROUND

Rope sawing machines are already known with which the sawing rope is slung in the form of an endless loop around a concrete body or the like that must be cut. As the depth of the cut increases, to maintain the cutting pressure of the rope, the sawing rope loop must be continuously lightened. To this end the rope driving device is positioned on a carriage or traveller that can be moved along horizontal rails. When large bodies must be cut, long rope loops, a long travelling path and correspondingly long rails are required. In many cases, however, a limited availability of space prevents the installation of long rails, which limits the use of such rope sawing machines.

THE INVENTION

It is an object of the invention to create a rope sawing machine of an as compact and simple as possible construction, which can also be used when the available space is limited, and to provide a rope sawing method suitable to be employed even in a small space.

Briefly, a rope storage is provided in form of a pulley-block to store the free rope loop in particular space-saving manner.

A prefered form can be realised by deflecting pulleys which are inclined for deflecting the saving rope into different rope running planes. Therefore different rope line numbers of the pulley-block increases the rope storage capacity.

The use of two parallel controllable hydraulic motors for the sawing rope drive permits a slow starting up when the sawing rope movements begins. As a result thereof the tensile forces acting on the sawing rope can be properly controlled and breaking of the rope due to excessive stress, especially when the rope starts to move, can be avoided.

To permit an adaptation to the progressing cutting operation, the rope loop that becomes free can be hung by hand around various rope deflecting pulleys and selectively in different rope line numbers, which permits a particularly compact construction of the rope sawing machine.

DRAWINGS

An exemplified embodiment of the subject of the invention is illustrated in the drawing and will be explained in greater detail in the following.

DETAILED DESCRIPTION

Figure 1:
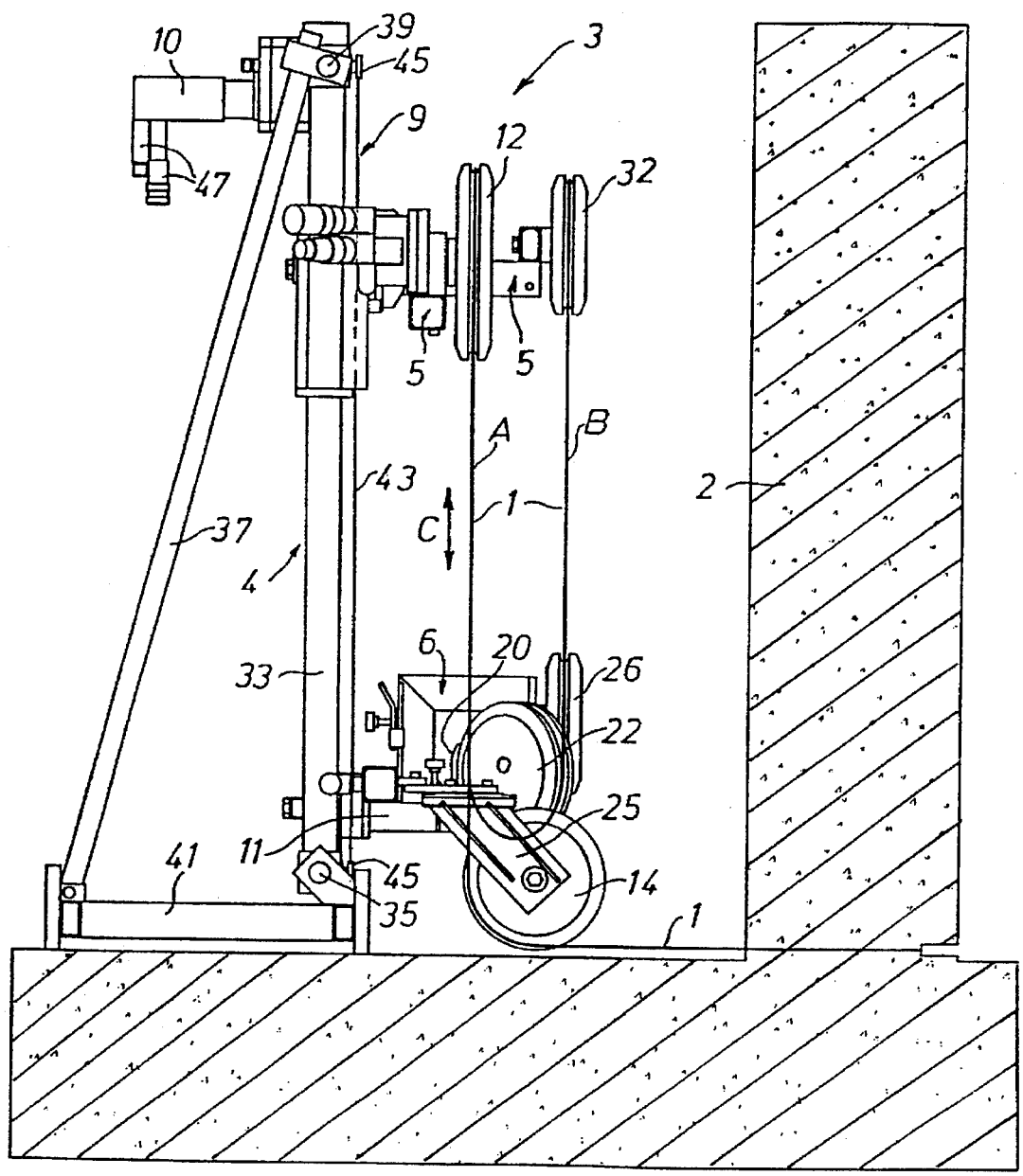
FIG. 1 shows a side view of a rope sawing machine together with a concrete body that must be cut.

The rope sawing machine is used to saw a concrete body, wall, rock or the like by means of a sawing rope 1, which normally is covered with diamond splinters or other suitable abrasive substances. To this end the sawing rope 1, which forms an endless loop, is slung around the body 2 that must be cut and guided over deflecting pulleys to a rope sawing machine 3. The rope sawing machine 3 has a frame 4 on which a top stationary pulley carrier 5 and a bottom moveable pulley carrier 6 are positioned. The drive of the sawing rope 1 takes place by two hydraulic motors 7, 8 positioned on the run-in and run-out side.

To tighten the sawing rope 1 in order to produce the cutting tension, a chain drive 9 acting on the bottom moveable pulley carrier 6 is provided, which is driven by a hydraulic motor 10 separate from the rope drive.

A first rope deflecting pulley 12 on the top pulley carrier 5 is connected to the hydraulic motor 7 on the drive side, and a second rope deflecting pulley 13 positioned on the top pulley carrier 5 is connected on the opposite side to the second hydraulic motor 8 on the drive side.

On a carrier 11 fastened in a detachable manner to the base of the frame 4, on the left and the right one further deflecting pulley 14, 16 each is provided, each fastened to a rotatable plate 17. These two bottom deflecting pulleys 14, 16 fastened rotatably to an inclined bracket 25 determine the cutting plane of the sawing rope 1. To adjust their rope position the carriers 11 are height adjustable along the frame 4 and can be locked in the selected position.

The inclined brackets 25 for the rope deflecting pulleys 14, 16 are positioned on the rotary plate 17 with vertical axis of rotation and can be locked in the desired positions by means of locking bolts 21. The bottom pulley carrier 6 furthermore has another rope deflecting pulley 20. The rope deflecting pulleys 12, 13 and 20 lie in a first rope running plane A.

To deflect the sawing rope 1 into a second rope running plane B, two rope deflecting pulleys 22, 24, each inclined at an angle of about 45°, are provided on the bottom pulley carrier 6, which therefore together form a right angle which is open in the direction of the concrete body 2. The bottom pulley carrier 6 carries a further rope deflecting pulley 26, which together with the rope deflecting pulleys 32 and 34 located on the top pulley carrier 5 are all positioned in the second rope running plane B.

The frame 4 on which the top and bottom pulley carriers 5, 6 are mounted, comprises two parallel cylindrical rods 33, which at the base of the frame can swivel around a horizontal bolt 35.

Two parallel inclined struts 37 are supported at the top end of the frame by axles 39. The bottom end of the struts 37 is connected to the base of the frame by bottom rails 41. By changing the length of the bottom rails 41 or the support point of the struts 37, the rods 33 can be inclined when required.

The height adjustment of the moveable pulley carrier 6 takes place by means of a chain drive with an endless chain 43. This chain 43 is guided both at the top and bottom around chain wheels 45. The top chain wheel 45 is connected to a drive motor, which preferably is a hydraulic motor 10 with connections 47. With this motor drive the bottom pulley carrier 6 can, therefore, be moved along the rods 33 in the direction of the double arrow C.

The supply of hydraulic oil to the two hydraulic motors 7, 8 takes place by way of connecting nipples 49, 51 and hose or pipe lines 50. The return flow takes place by way of conventional return lines (not shown).

OPERATION

As the sawing operation progresses, the rope length that comes free is hung by hand around various deflecting pulleys, as will be described in greater detail in the following with reference to FIGS. 4–6. This results in a pulley block storage arrangement with multiple reduction and with different numbers of rope lines.

Figure 2:
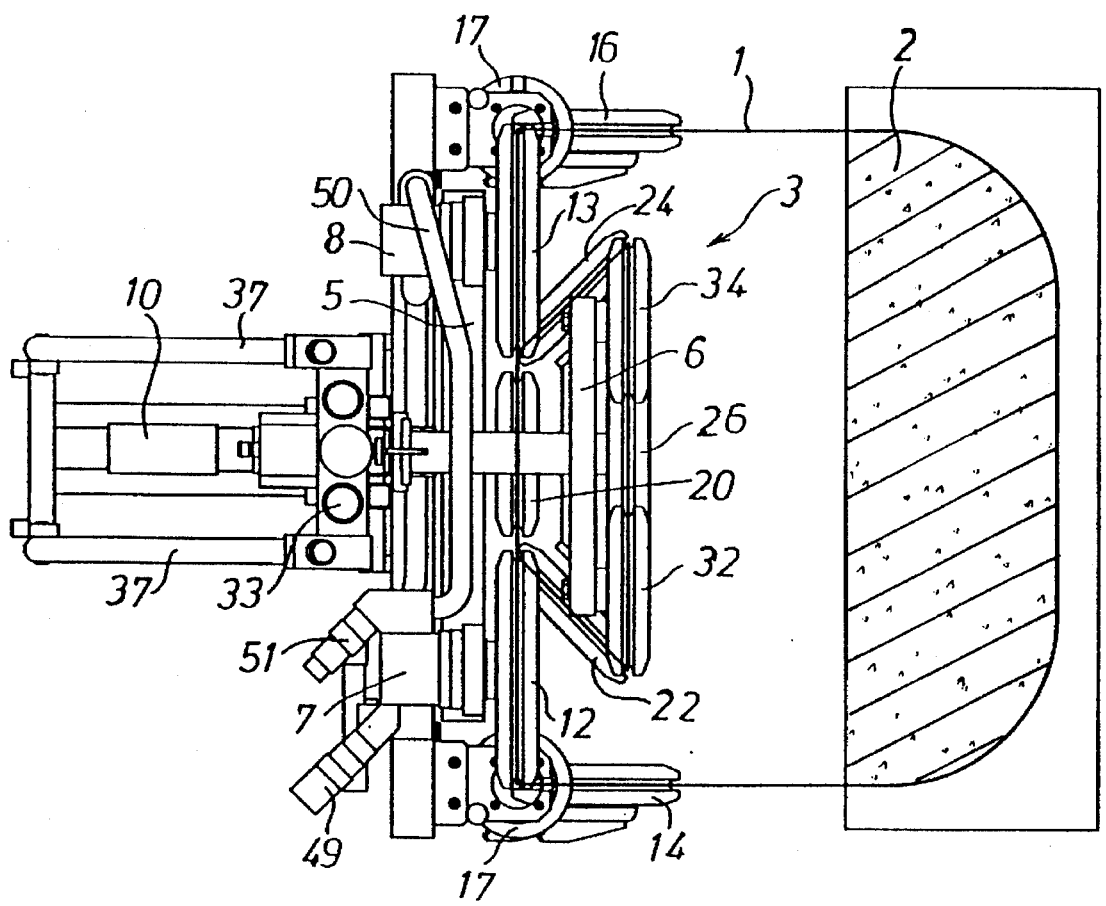
FIG. 2 is a top view onto the rope sawing machine with the body that must be cut.
Figure 3:
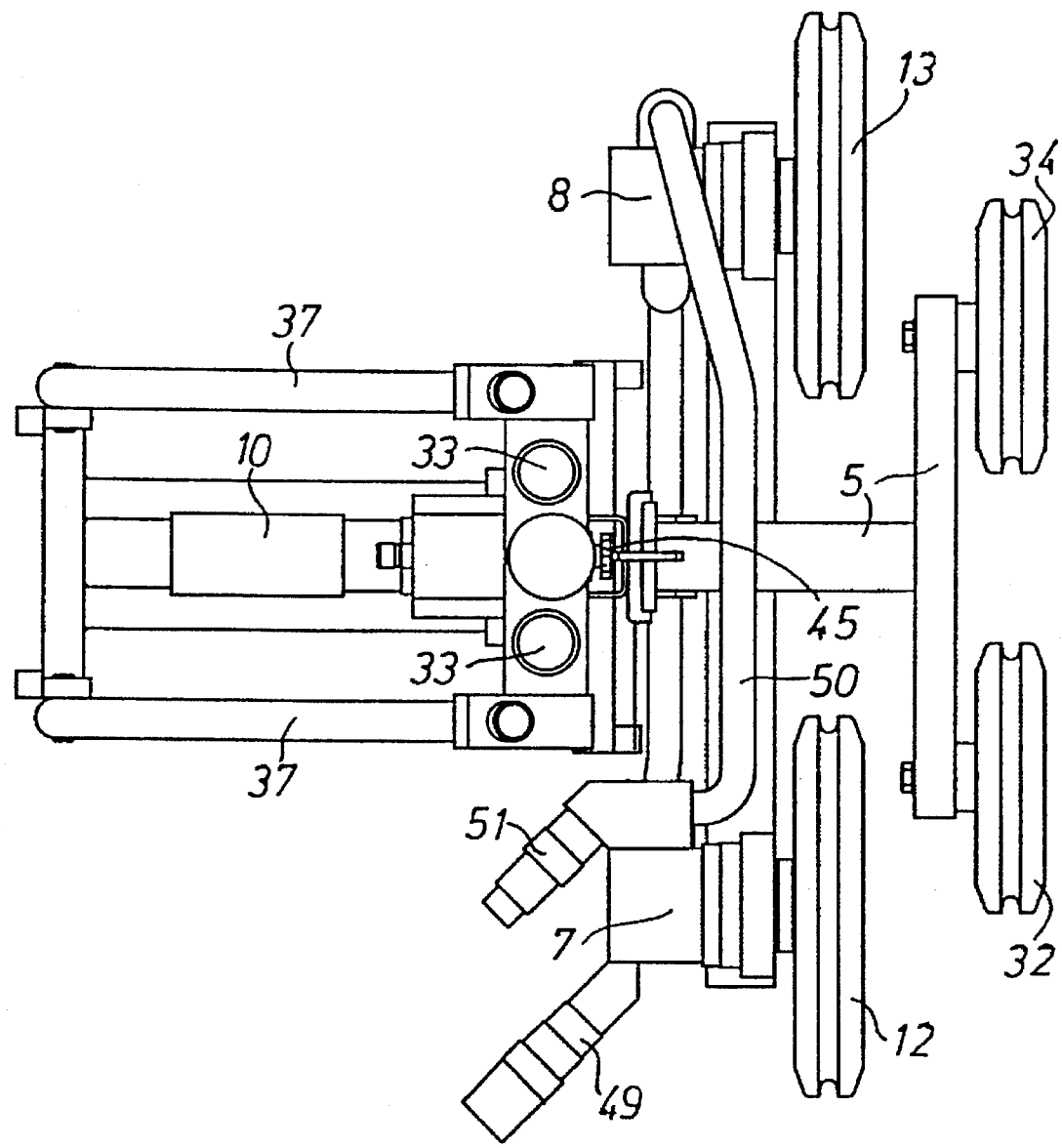
FIG. 3 is a top view onto the top pulley carrier, without sawing rope.
Figure 4:
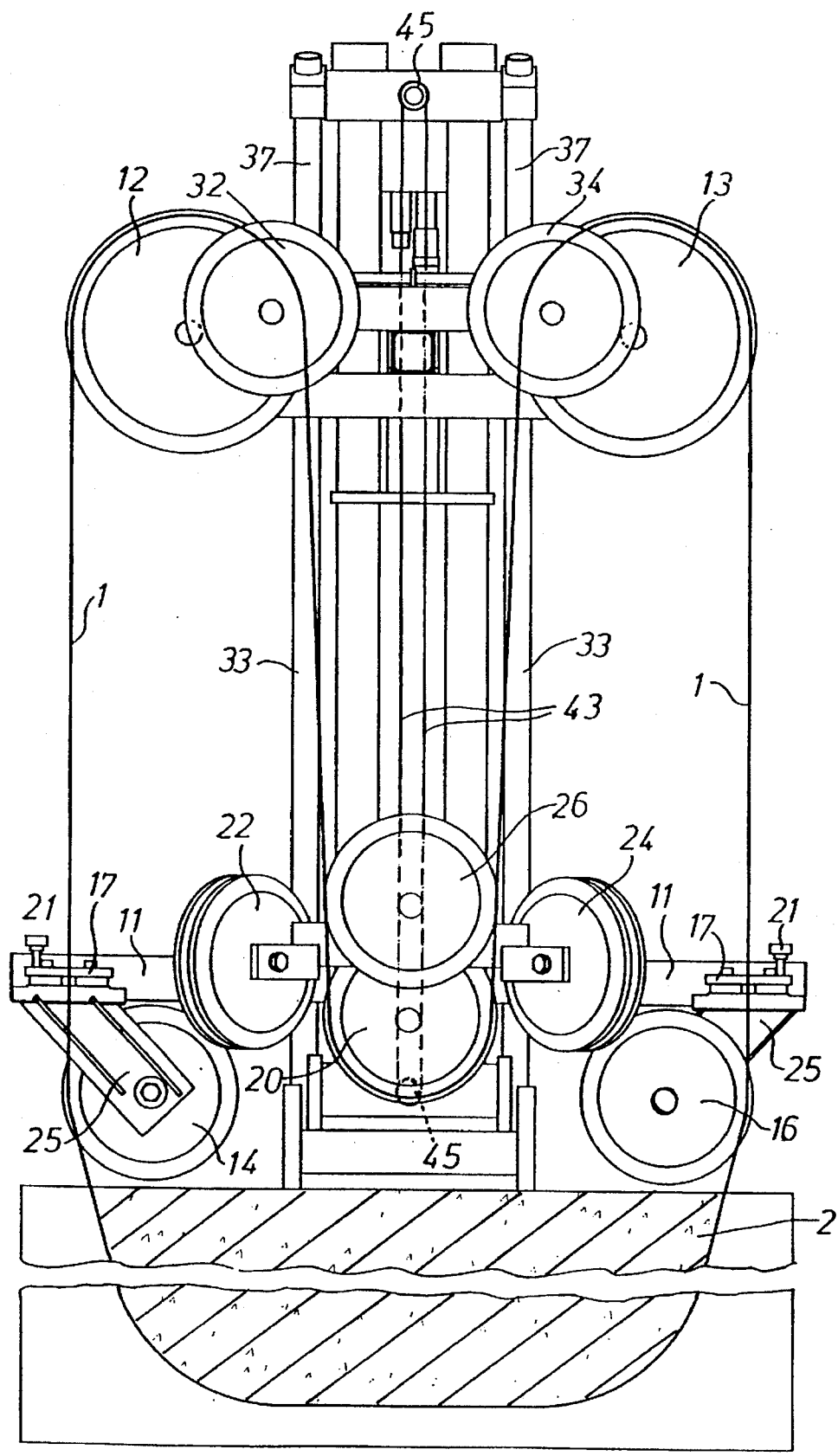
FIG. 4 is a front view of the rope sawing machine with a first type of rope guidance.
Figure 5:
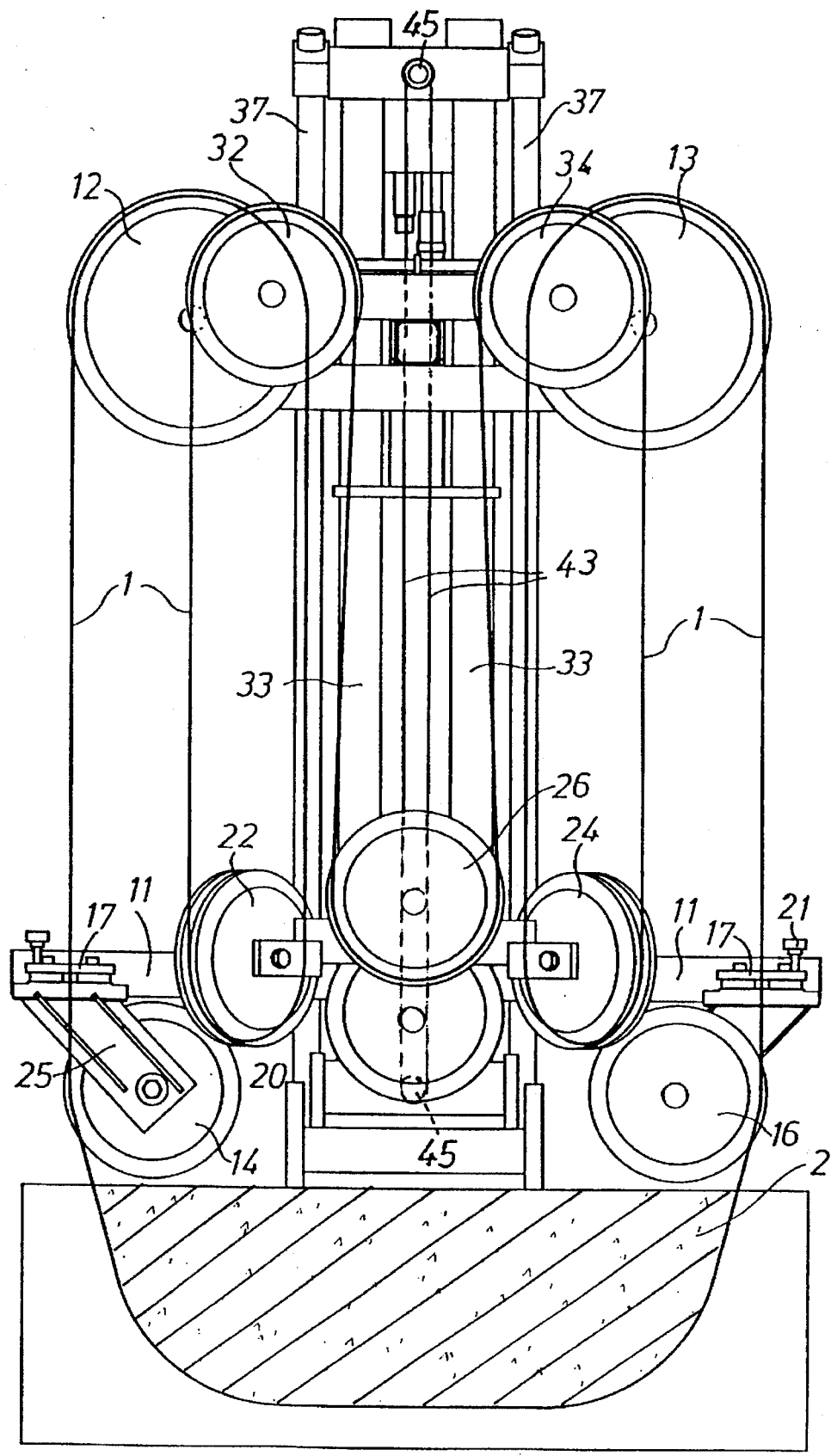
FIG. 5 is a front view of the rope sawing machine with a second type of rope guidance.

FIG. 4 shows a first embodiment of the rope guidance where, in contrast to FIGS. 1 and 2, the cutting plane does not extend horizontally, but vertically. The sawing rope 1 slung around the body 2 that must be cut passes over the deflecting pulley 14, then up over the first deflecting pulley 12 on the top pulley carrier 5, and then over the deflecting pulley 20 on the bottom pulley carrier 6, up over the second deflecting pulley 13 on the top pulley carrier 5 and finally over the deflecting pulley 16. All rope lines are positioned in the same rope plane A.

With the embodiment illustrated in FIG. 4 the bottom pulley carrier 6 with the deflecting pulley 20 is approximately in its bottom end position. At the beginning of the sawing operation the pulley carrier 6 is brought into its top end position by the chain 43. The drive motor 10 of the chain 43 moves the pulley carrier 6 slowly downwards and as a result thereof the sawing rope 1 is continuously tightened as the sawing progresses. When the bottom end position of the pulley carrier 6 illustrated in FIG. 4 is reached, the pulley carrier 6 is moved into its top end position by the chain 9. The sawing rope is hung over by hand, see FIG. 5.

According to FIG. 5 the rope guidance now is as follows: deflecting pulleys 14, 12, first inclined pulley 22, deflecting pulleys 32, 34, second inclined pulley 24, deflecting pulleys 13, 16. The sawing rope 1 accordingly runs in the rope planes A and B. The rope tension required for the sawing operation is obtained by the downwards movement of the pulley carrier 6 on which the inclined pulleys 22, 24 are located.

Figure 6:
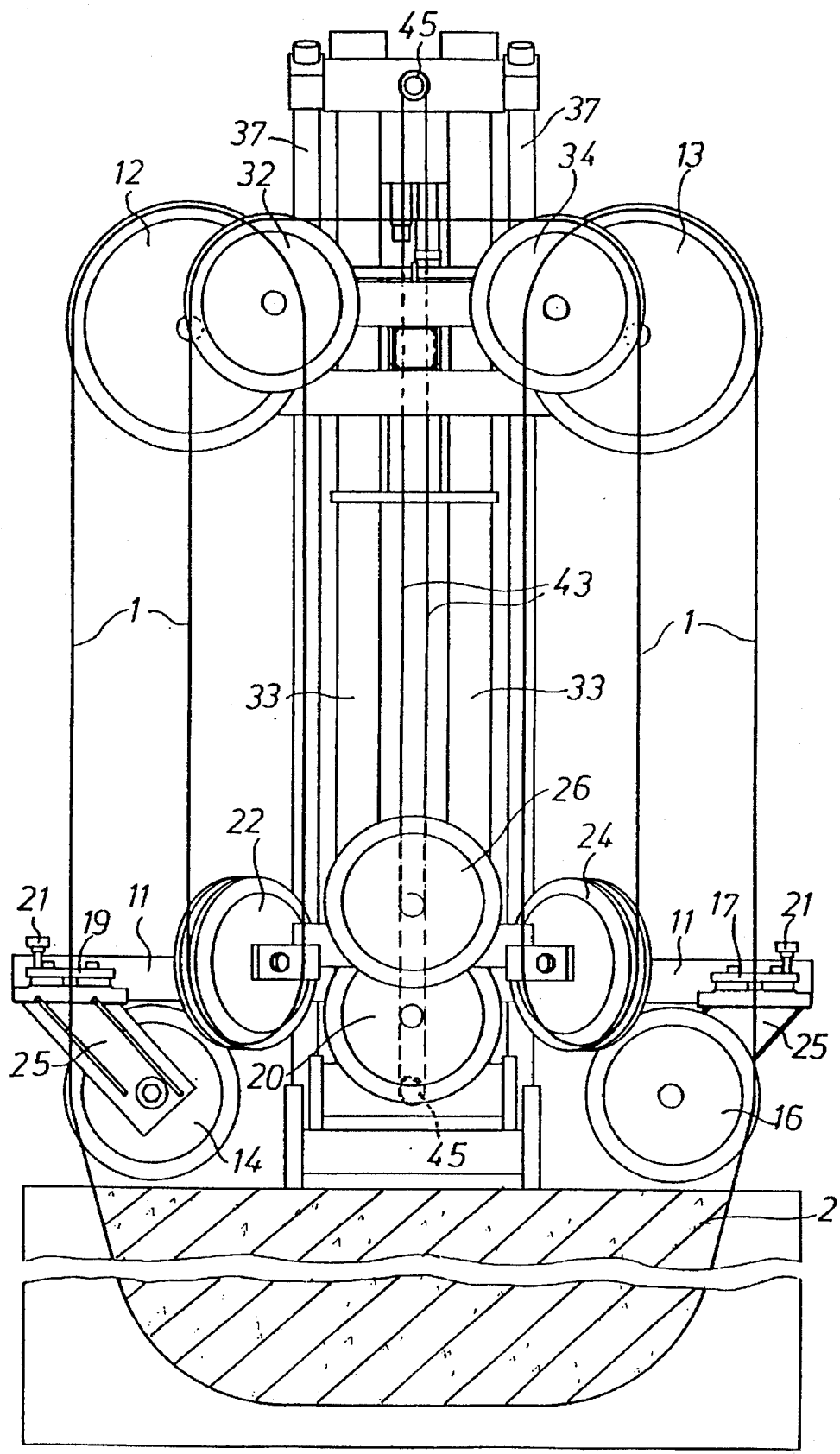
FIG. 6 is a front view of the rope sawing machine with a third type of rope guidance.

FIG. 6 shows the rope guidance after a further hanging over operation, after, previously the pulley carrier 6 has been moved into its top starting position. The rope guidance is now as follows: pulleys 14, 12, 22, 32, 26, 34, 24, 13, 16. By moving the pulley carrier 6 downwards, the sawing rope 1 is tightened.

As a variant, instead of a chain drive it is also possible to provide a rack extending parallel to the rods 33 and a driven pinion located on the pulley carrier 6.

Instead of the preferred vertical position of the frame 4, it could also be positioned at a slant or horizontally.

I claim:

1. Rope-type sawing machine for making severing cuts in rock, bodies of concrete, masonry or the like, having a motor-driven saw rope (1) equipped with abrasive material, and guided in a sawing loop, said machine comprising a pulley-block rope storage arrangement including a frame (4) and stationary and movably mounted pulleys (12, 13, 14, 16);

two pulley carriers (5, 6), at least one (6) of which is movable, mounting said pulleys, said saw rope (1) being looped around said pulleys (12, 13, 14, 16), and further including inclined pulleys (22, 24) for deflecting the sawing rope (1) into different running planes (A, B), located on at least one (6) of said pulley carriers (5, 6); and a linear power drive (10, 45) coupled to one (6) of said pulley carriers for linear movement of said pulley carriers (5, 6) by said linear power drive with respect to each other.

2. The machine of claim 1, including a rope drive coupled to at least one of said pulleys, said rope drive including two parallel controllable hydraulic motors (7, 8) respectively coupled to pulleys located on a run-in and run-out side of said rope (1) with respect to the severing cut.

3. The machine of claim 1, further including a frame (4);

a two parallel guide rods (33) on said frame, said guide rods supporting that one (6) of said pulley carriers which is movable; and wherein the frame can be swiveled about a horizontal axis of rotation (35) provided on the base of the frame.

4. The machine of claim 1, wherein said movable drive for that one (6) of said pulley carriers which is movable is operatively associated with said parallel rods (33), said rods forming guide rails; and coupling means, optionally a driven chain drive (9, 43, 45) connecting said power drive to said one movable pulley carrier (6).

5. The machine of claim 1, further including a frame (4);

two parallel guide rods (33) on said frame, said guide rods supporting that one (6) of said pulley carriers which is movable; and deflecting pulleys (14, 16) located on the base of the frame at the rope run-in and run-out side, with respect to said severing cut, said deflecting pulleys being swivelable positioned on said frame for swiveling about an axis at right angle to their axis of rotation.

6. A method for operating the rope sawing machine as claimed in claim 1, comprising increasing the number of rope lines on said rope storage arrangement as the depth of cut increases, according to the rope storage capacity of said arrangement of the pulleys thereof;

and manually repositioning free sawing rope (1) around respective various ones of said pulleys, including said inclined pulleys (12, 13, 22, 24, 26).

7. A method for operating a rope sawing machine, wherein said rope sawing machine has a plurality of rope deflecting pulleys (12, 13, 14, 16, 22, 24, 26), some of which (22, 24) are inclined pulleys for deflecting the sawing rope into selectively different running planes (A, B), and wherein some of said pulleys (14, 16) are located on a movable pulley carrier (6), said method comprising manually repositioning free sawing rope (1) about selected ones of said pulleys as the depth of cut increases to increase the number of rope lines, and accordingly change the rope storage capacity of the sawing machine.

* * * * *